(12) United States Patent
Knapp et al.

(10) Patent No.: US 6,797,023 B2
(45) Date of Patent: Sep. 28, 2004

(54) COATED ABRASIVES

(75) Inventors: Christopher E. Knapp, N. Grimsby (CA); Olivier Leon-Marie Fernand Guiselin, Williamsville, NY (US); Kenneth Lorenz, Buffalo, NY (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 155 days.

(21) Appl. No.: 10/145,367

(22) Filed: May 14, 2002

(65) Prior Publication Data

US 2003/0213182 A1 Nov. 20, 2003

(51) Int. Cl.⁷ ............................................... B24D 3/00
(52) U.S. Cl. ........................... 51/298; 51/307; 428/323
(58) Field of Search ......................... 51/298, 307, 309, 51/295; 428/323

(56) References Cited

U.S. PATENT DOCUMENTS

| | | |
|---|---|---|
| 2,194,472 A | 3/1940 | Jackson |
| 3,048,482 A | 8/1962 | Hurst |
| 3,916,584 A | 11/1975 | Howard et al. |
| 3,982,359 A * | 9/1976 | Elbel et al. ................... 51/295 |
| 4,311,489 A | 1/1982 | Kressner |
| 4,364,746 A | 12/1982 | Bitzer et al. |
| 4,541,842 A | 9/1985 | Rostoker |
| 4,575,384 A * | 3/1986 | Licht et al. ................... 51/308 |
| 4,799,939 A | 1/1989 | Bloecher et al. |
| 5,039,311 A * | 8/1991 | Bloecher ...................... 51/295 |
| 5,498,268 A * | 3/1996 | Gagliardi et al. ............. 51/294 |
| 5,551,962 A * | 9/1996 | Ho ............................... 51/306 |
| 5,562,745 A * | 10/1996 | Gagliardi et al. ............. 51/298 |
| 5,975,988 A | 11/1999 | Christianson |
| 6,056,794 A | 5/2000 | Stoetzel et al. |

FOREIGN PATENT DOCUMENTS

| | | | |
|---|---|---|---|
| JP | 56089479 | * | 7/1981 |
| WO | WO 01/85393 | | 11/2001 |
| WO | WO 02/28802 | | 4/2002 |

* cited by examiner

Primary Examiner—Archene Turner
(74) Attorney, Agent, or Firm—Joseph P. Sullivan

(57) ABSTRACT

Novel coated abrasives comprising abrasive agglomerate grains characterized by a high porosity and low ratio of solid volume to nominal volume provide exceptionally useful medium to low pressure grinding characteristics.

39 Claims, 7 Drawing Sheets

COATED ABRASIVES

BACKGROUND TO THE INVENTION

The present invention relates to coated abrasives and particularly to abrasive products adapted to perform in an improved fashion when used under moderate to low pressure grinding conditions.

In the production of coated abrasives a backing material, which may be treated to modify the absorptive properties, is provided with a make coat comprising a curable binder resin and abrasive grains are deposited on the make coat before the binder is at least partially cured. Thereafter a size coat comprising a curable binder resin is deposited over the abrasive grain to ensure the grains are securely anchored to the backing.

When the coated abrasive is used to abrade a workpiece, the tips of the abrasive grains lying in the plane of the surface contact the workpiece and begin the work of abrasion. The grains thus contacting the workpiece are subjected to great stresses and, if the grain is not adequately held by the size coat it can be plucked from the surface before it has completed abrading. The bond therefore should hold the grain securely. As abrading continues the grain can become polished, in which case significant frictional heat is generated and little removal of the workpiece occurs. In addition the stresses build up further and eventually the grain is either plucked out completely of it fractures so that a large portion is lost. This however generates new sharp edges such that abrading can resume. Ideally the mode of fracture should be as small as possible such that each grain will last a long time. This is achieved using sol-gel alumina abrasive grains which each comprises micron-sized or smaller crystallites which, under grinding conditions, can break off to reveal new cutting edges. However this occurs under moderate to heavy grinding pressure and only a reduced amount of self-sharpening occurs at lower pressure grinding conditions. There is therefore a need for a highly effective abrasive particle that operates very efficiently at moderate to low pressure grinding conditions.

One option that has been explored is the use of agglomerated abrasive grains in which an abrasive particle made up of a number of finer abrasive particles is held together by a bond material that can be organic or vitreous in nature. Because the bond is in general more friable than the abrasive particles, the bond fractures under grinding conditions that would otherwise lead to polishing or wholesale fracture of the abrasive grain.

Agglomerated abrasive grain generally permit the use of smaller particle (grit) sizes to achieve the same grinding efficiency as a larger abrasive grit size. Agglomerated abrasive grains have also been reported to improve grinding efficiency.

U.S. Pat. No. 2,194,472 to Jackson discloses coated abrasive tools made with agglomerates of a plurality of relatively fine abrasive grain and any of the bonds normally used in coated or bonded abrasive tools. Organic bonds are used to adhere the agglomerates to the backing of the coated abrasives. The agglomerates lend an open-coat face to coated abrasives made with relatively fine grain. The coated abrasives made with the agglomerates in place of individual abrasive grains are characterized as being relatively fast cutting, long-lived and suitable for preparing a fine surface finish quality in the work-piece.

U.S. Pat. No. 2,216,728 to Benner discloses abrasive grain/bond agglomerates made from any type of bond. The object of the agglomerates is to achieve very dense wheel structures for retaining diamond or CBN grain during grinding operations. If the agglomerates are made with a porous structure, then it is for the purpose of allowing the inter-agglomerate bond materials to flow into the pores of the agglomerates and fully densify the structure during firing. The agglomerates allow the use of abrasive grain fines otherwise lost in production.

U.S. Pat. No. 3,048,482 to Hurst discloses shaped abrasive micro-segments of agglomerated abrasive grains and organic bond materials in the form of pyramids or other tapered shapes. The shaped abrasive micro-segments are adhered to a fibrous backing and used to make coated abrasives and to line the surface of thin grinding wheels. The invention is characterized as yielding a longer cutting life, controlled flexibility of the tool, high strength and speed safety, resilient action and highly efficient cutting action relative to tools made without agglomerated abrasive grain micro-segments.

U.S. Pat. No. 3,982,359 to Elbel teaches the formation of resin bond and abrasive grain agglomerates having a hardness greater than that of the resin bond used to bond the agglomerates within an abrasive tool. Faster grinding rates and longer tool life are achieved in rubber bonded wheels containing the agglomerates.

U.S. Pat. No. 4,355,489 to Heyer discloses an abrasive article (wheel, disc, belt, sheet, block and the like) made of a matrix of undulated filaments bonded together at points of manual contact and abrasive agglomerates, having a void volume of about 70–97%. The agglomerates may be made with vitrified or resin bonds and any abrasive grain.

U.S. Pat. No. 4,364,746 to Bitzer discloses abrasive tools comprising different abrasive agglomerates having different strengths. The agglomerates are made from abrasive grain and resin binders, and may contain other materials, such as chopped fibers, for added strength or hardness.

U.S. Pat. No. 4,393,021 to Eisenberg, et al, discloses a method for making abrasive agglomerates from abrasive grain and a resin binder utilizing a sieve web and rolling a paste of the grain and binder through the web to make worm-like extrusions. The extrusions are hardened by heating and then crushed to form agglomerates.

U.S. Pat. No. 4,799,939 to Bloecher teaches erodable agglomerates of abrasive grain, hollow bodies and organic binder and the use of these agglomerates in coated abrasives and bonded abrasives. Higher stock removal, extended life and utility in wet grinding conditions are claimed for abrasive articles comprising the agglomerates. The agglomerates are preferably 150–3,000 microns in largest dimension. To make the agglomerates, the hollow bodies, grain, binder and water are mixed as a slurry, the slurry is solidified by heat or radiation to remove the water, and the solid mixture is crushed in a jaw or roll crusher and screened.

U.S. Pat. No. 5,129,189 to Wetscher discloses abrasive tools having a resin bond matrix containing conglomerates of abrasive grain and resin and filler material, such as cryolite.

U.S. Pat. No. 5,651,729 to Benguerel teaches a grinding wheel having a core and an abrasive rim made from a resin bond and crushed agglomerates of diamond or CBN abrasive grain with a metal or ceramic bond. The stated benefits of the wheels made with the agglomerates include high chip clearance spaces, high wear resistance, self-sharpening characteristics, high mechanical resistance of the wheel and the ability to directly bond the abrasive rim to the core of the wheel. In one embodiment, used diamond or CBN bonded grinding rims are crushed to a size of 0.2 to 3 mm to form the agglomerates.

U.S. Pat. No. 4,311,489 to Kressner discloses agglomerates of fine ($\leq 200$ micron) abrasive grain and cryolite, optionally with a silicate binder, and their use in making coated abrasive tools.

U.S. Pat. No. 4,541,842 to Rostoker discloses coated abrasives and abrasive wheels made with agglomerates of abrasive grain and a foam made from a mixture of vitrified bond materials with other raw materials, such as carbon black or carbonates, suitable for foaming during firing of the agglomerates. The agglomerate "pellets" contain a larger percentage of bond than grain on a volume percentage basis. Pellets used to make abrasive wheels are sintered at 900° C. (to a density of 70 lbs/cu. ft.; 1.134 g/cc) and the vitrified bond used to make the wheel is fired at 880° C. Wheels made with 16 volume % pellets performed in grinding with an efficiency similar to that of comparative wheels made with 46 volume % abrasive grain. The pellets contain open cells within the vitrified bond matrix, with the relative smaller abrasive grains clustered around the perimeter of the open cells. A rotary kiln is mentioned for firing the green foam agglomerates.

U.S. Pat. No. 5,975,988 teaches conventional abrasive agglomerates comprising abrasive particles dispersed in a binder matrix but in the form of shaped grains deposited in a precise order on a backing and bonded thereto.

U.S. Pat. No. 6,319,108 describes a rigid backing with, adhered thereto by a metal coating, a plurality of abrasive composites comprising a plurality of abrasive particles dispersed throughout a porous ceramic matrix.

None of these prior art developments suggest the manufacture of coated abrasives using porous agglomerated abrasive grain as the term is used herein and a bond. Neither do they suggest the production of a product with abrasive particles held together by a relatively small amount of bond such that the particle binder phase is discontinuous. The methods and tools of the invention yield new structures and benefits from the use of such agglomerated abrasive grains, yet they are sophisticated in permitting the controlled design and manufacture of broad ranges of abrasive article structures having beneficial interconnected porosity characteristics. Such interconnected porosity enhances abrasive tool performance in large contact area, precision grinding operations, and in general relatively medium to low pressure grinding applications.

SUMMARY OF THE INVENTION

The present invention provides a coated abrasive article comprising a backing material and adhered thereto by a binder material, abrasive agglomerate grains characterized in that the grains used in the production of the coated abrasive comprise a plurality of abrasive particles adhered together in a three dimensional structure in which each particle is joined to at least one adjacent particle by a particle binder material which is present in the agglomerate as a discontinuous phase within the agglomerate grain and is located essentially completely in the form of bond posts linking adjacent particles, such that the agglomerate has a loose pack volume that is at least 2% lower than that of the abrasive particles in the individual state.

In this application the term "grains" will be reserved for agglomerates of a plurality of abrasive "particles". Thus the grains will have the above identified porosity characteristics whereas the particles will have essentially zero porosity. Further the binder holding the particles together is identified as a "particle binder" which may be the same, (or more often different from), the binder by which the grains are attached to the backing material.

The particle binder in the agglomerate grains is located essentially completely in the form of bond posts and this means that at least 70% of the binder, and preferably in excess of 80%, is used to form bond posts linking adjacent particles. A bond post is formed under agglomerate forming conditions when the particle binder is in a fluid condition and tends first to coat the particles and then to flow to points of contact or closest approach of adjacent particles and to merge with the binder associated with such adjacent particles. When the temperature is lowered and the binder solidifies the binder forms a solid contact between the particles that is known as a "bond post". Naturally each bond post is also attached to the surface of the particles it connects but this binder is considered part of the bond post for the sake of this description. This does not exclude the possibility that some relatively small amount is present as a coating on at least part of the particle surface not associated with a bond post. It is intended however to exclude the situation in which the particles are embedded in a matrix of binder as occurs in conventional aggregate abrasive grains. As is apparent from examination of FIGS. 5–7 of the Drawings the individual abrasive particles making up the agglomerate grain are individually identifiable and indeed are essentially all that can be seen in typical agglomerate grains according to the invention. It is therefore possible to describe the particles as being "agglomerated" implying being linked together rather than being held in a matrix which fills the larger portion of the space between the particles. Naturally when larger numbers of particles are agglomerated some individuals within the agglomerate will not be individually visible, but if it were possible to take a cross-section, the same pattern of individual particle visibility would be evident.

Clearly when the number of particles agglomerated becomes large, there will necessarily be substantial volumes of porosity created by this agglomeration. This can be as much as 70% of the total apparent volume of the agglomerate. However when the numbers of particles agglomerated are small, perhaps in the single figures, the concept of "porosity" becomes less useful in describing the agglomerates. Examples of such agglomerates showing the kind of structures involved are illustrated in FIGS. 5–7.

For this reason the term "loose pack volume" (LPV) is adopted. The LPV value is obtained by dividing the solid volume, (that is the total actual volume of the solids in the abrasive grain or particle, including the bond component) by the apparent volume of the agglomerate grain. The highest possible figure will be obtained from the particles themselves without any agglomeration having taken place. The larger the number of particles agglomerated, the greater the divergence from the maximum figure. Thus while the difference can be as low as 2% it can rise to 40% or even higher when larger numbers of particles are agglomerated together in the manner taught herein.

The calculation of the LPV is exemplified using the following data which represent actual agglomerate made using 60 grit particles of a seeded sol-gel alumina as the abrasive particles and a conventional vitreous bond suitable for use with such particles using a process substantially as described in Example 2 below.

The products are identified by the agglomerate grain size shown at the head of each column. In each case the measurements were made of the basis of a fixed volume of the agglomerate abrasive grains, referred to here as the "Apparent Volume".

|  | Particles 60 grit | −40 +45 | −30 +35 | −25 +30 | −20 +25 |
|---|---|---|---|---|---|
| Weight | 25.1 | 23.1 | 19.73 | 18.3 | 16 |
| Density (of solid)* | 3.9 | 3.759 | 3.759 | 3.759 | 3.759 |
| Vol. of grit + bond | 6.436 | 6.145 | 5.249 | 4.868 | 4.256 |
| Apparent Volume | 12.797 | 12.797 | 12.797 | 12.797 | 12.797 |
| LPV | 0.503 | 0.480 | 0.410 | 0.380 | 0.333 |

*Density estimated according to the rule of mixtures.

As will be appreciated from the above, the larger the agglomerate grain, the smaller the LPV by comparison with that of the unagglomerated particles. The smallest grains showed a 4.6% drop in LPV whereas the largest (−20+25) showed a drop of nearly 34% by comparison with the LPV of the 60 grit particles.

The agglomerate grains generally have a diameter, (defined as the size of the aperture in a sieve (of series of standard sieves) with the coarsest mesh on which the grains are retained), that is at least two times the diameter of the individual abrasive particles contained therein. The shape of the agglomerate abrasive grains is not critical and they can therefore be random somewhat blocky shapes or, more preferably, somewhat elongated shapes. They can also have an imposed shape this is often advantageous for some applications.

The abrasive particles present in the agglomerates of the invention may include one or more of the abrasives known for use in abrasive tools, such as aluminas, including fused alumina, sintered and sol gel sintered alumina, sintered bauxite, and the like, silicon carbide, alumina-zirconia, garnet, flint, diamond, including natural and synthetic diamond, cubic boron nitride (CBN), and combinations thereof. Any size or shape of abrasive particle may be used. For example, the grain may include elongated sintered sol gel alumina particles having a high aspect ratio of the type disclosed in U.S. Pat. No. 5,129,919 or the filamentary shaped abrasive particles described in U.S. Pat. No. 5,009,676.

The abrasive particles can comprise blends of abrasives of different qualities since often the performance of a premium quality particles is only marginally diminished by dilution with minor amounts of inferior particles. It is also possible to blend the abrasive particles with minor amounts of non-abrasive materials such as grinding aids, pore formers and filler materials of conventional sorts.

Particle sizes suitable for use herein range from regular abrasive grits (e.g., 60 to 7,000 micrometers) to microabrasive grits (e.g., 2 to 60 micrometers), and mixtures of these sizes. For any given abrasive grinding operation, it is generally preferred to use an agglomerate grain with a grit size smaller than a conventional abrasive grain (non-agglomerated) grit size normally selected for this abrasive grinding operation. For example, when using agglomerate grains, 80 grit size is substituted for 54 grit conventional abrasive, 100 grit for 60 grit abrasive and 120 grit for 80 grit abrasive and so on.

The abrasive particles within the agglomerate are bonded together by a metallic, organic or vitreous bond material and these are referred to generically as "particle binders".

Particle binders useful in making the agglomerates include vitreous materials, (defined herein to include both conventional glass materials as well as glass-ceramic materials), preferably of the sort used as bond systems for vitrified bonded abrasive tools. These may be a pre-fired glass ground into a powder (a frit), or a mixture of various raw materials such as clay, feldspar, lime, borax, and soda, or a combination of fritted and raw materials. Such materials fuse and form a liquid glass phase at temperatures ranging from about 500 to 1400° C. and wet the surface of the abrasive particles and flow to points of closest contact between adjacent particles to create bond posts upon cooling, thus holding the abrasive particles within a composite structure. The particle binder is used in powdered form and may be added to a liquid vehicle to insure a uniform, homogeneous mixture of coating with abrasive particles during manufacture of the agglomerate grains.

Temporary organic binders are preferably added to powdered inorganic coating components, whether fritted or raw, as molding or processing aids. These binders may include dextrins, starch, animal protein glue, and other types of glue; a liquid component, such as water or ethylene glycol, viscosity or pH modifiers; and mixing aids. Use of such temporary binders improves agglomerate uniformity and the structural quality of the pre-fired or green agglomerates. Because the organic binders burn off during firing of the agglomerate grains, they do not become part of the finished grain.

An inorganic adhesion promoter, such as phosphoric acid, may be added to the mixture to improve adhesion of the particle binder to the abrasive particles as needed. The addition of phosphoric acid to alumina grains greatly improves the mix quality when the particle binder comprises a fritted glass. The inorganic adhesion promoter may be used with or without an organic particle binder in preparing the agglomerate grains.

The preferred particle binder is an inorganic material such as a vitreous bond material. This has a distinct advantage over organic particle binders because it permits the agglomerate grains to be deposited on a substrate in the formation of a coated abrasive using a UP technique. The UP deposition technique is also very suited to use when the particles are bonded together using a metallic binder. Since this process is somewhat more effective and controllable than a gravity deposition technique this represents a significant advance over conventional aggregate grains made using an organic resin binder matrix.

The particle binder can also be an organic binder such as a thermosetting resin such as a phenolic resin, an epoxy resin, a urea/formaldehyde resin, or a radiation-curable resin such as an acrylate, a urethane/acrylate, an epoxy-acrylate, a polyester-acrylate and the like. In general thermosetting resins are preferred as organic binders.

The particle binder is present at about 2 to 25 volume %, more preferably 3 to 15 volume %, and most preferably 3 to 10 volume % based on the combined volume of the particles and binder.

It is also foreseen that the particle binder component can be eliminated altogether if the abrasive particles are caused to sinter together in a controlled fashion such that, by material transport between contacting particles, the bondposts would be autogenously generated. Alternatively where the abrasive particles are alumina, these could be mixed with a sol of relatively small amount of an alpha alumina precursor such as boehmite. Upon firing this would convert to the alpha phase and would serve the same function as bond posts by connecting adjacent particles.

The invention includes coated abrasives incorporating agglomerated abrasive grain wherein the grains are made by a process which comprises the steps of:

a) feeding abrasive particles and a particle binder material, selected from the group consisting essentially of vitrified bond materials, vitrified materials, ceramic materials, inorganic binders, organic binders, water, solvent and combinations thereof, into a rotary calcination kiln at a controlled feed rate;
b) rotating the kiln at a controlled speed;
c) heating the mixture at a heating rate determined by the feed rate and the speed of the kiln to temperatures from about 145 to 1,300° C.,
d) tumbling the particles and the particle binder in the kiln until the binder adheres to the particles and a plurality of the particles adhere together to create sintered agglomerate grains; and
e) recovering the sintered agglomerates from the kiln, whereby the sintered agglomerate grains have an initial three-dimensional shape, a loose packing volume that is at least 2% below the corresponding loose pack volume of the constituent particles and comprise a plurality of abrasive particles.

The invention also includes coated abrasives incorporating sintered abrasive agglomerate grains that have been made by a method comprising the steps:

a) feeding abrasive particles along with a particle binder material into a rotary calcination kiln at a controlled feed rate;
b) rotating the kiln at a controlled speed;
c) heating the mixture at a heating rate determined by the feed rate and the speed of the kiln to temperatures from about 145 to 1,300° C.,
d) tumbling the abrasive particles and the particle binder in the kiln until the binder adheres to the grain and a plurality of grains adhere together to create sintered abrasive agglomerate grains; and
e) recovering the sintered agglomerate grains from the kiln, whereby the sintered agglomerate grains have an initial three-dimensional shape, comprise a plurality of particles and have a loose packing volume that is at least 2% below the corresponding loose pack volume of the constituent particles.

DETAILED DESCRIPTION OF THE INVENTION

Figure 1:
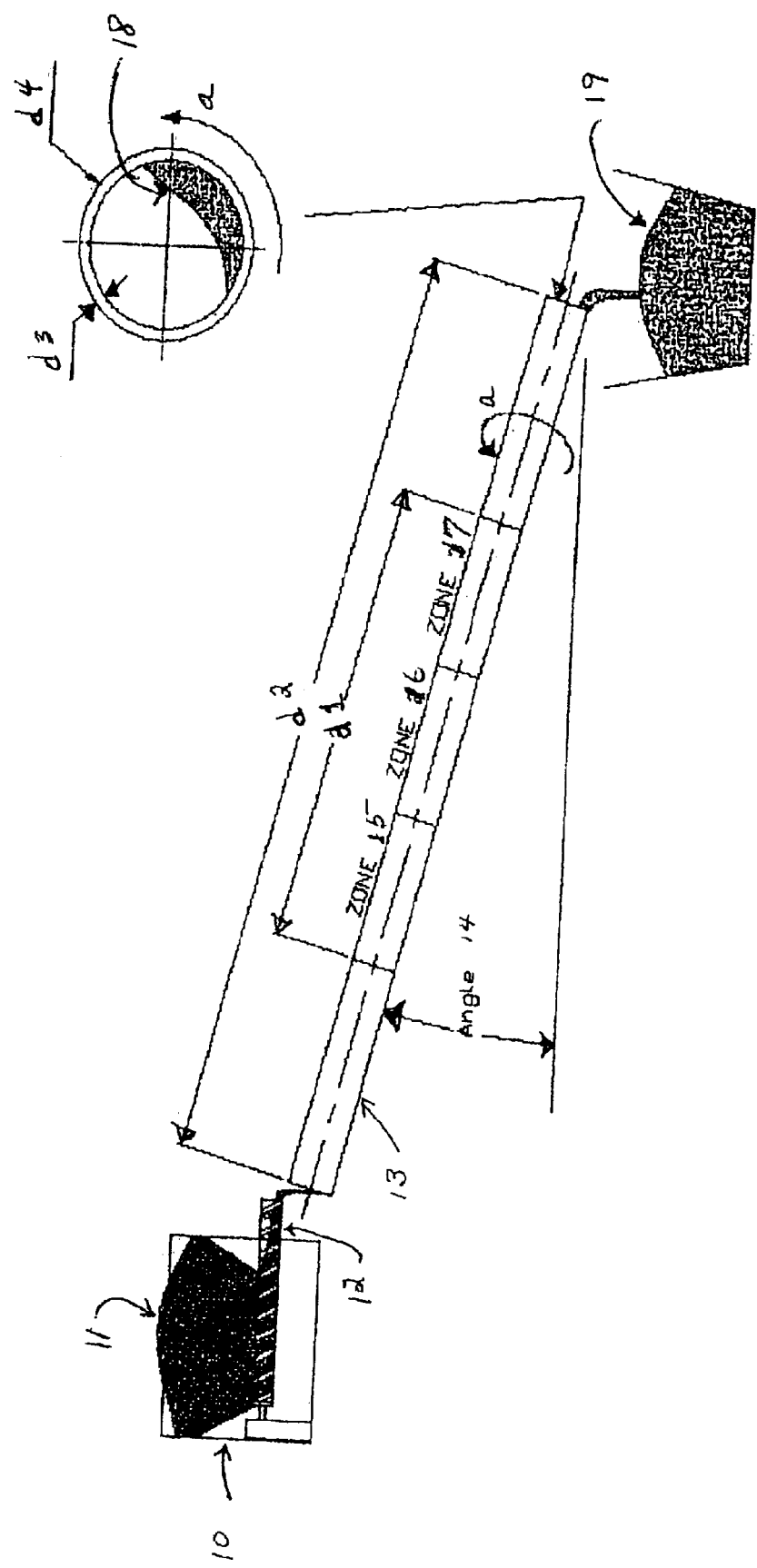
FIG. 1 is a rotary calcination apparatus that may be used to produce agglomerates according to the invention.

In this section the nature and production of the abrasive agglomerate grains and the coated abrasives made with such grains are explored and illustrated with the assistance of several Examples illustrating the surprisingly improved properties that are obtained by the use of the abrasive agglomerate grains as components of coated abrasives.

Manufacture of Abrasive Agglomerates

The agglomerate grains may be formed by a variety of techniques into numerous sizes and shapes. These techniques may be carried out before or after firing the initial ("green") stage mixture of grain and particle binder. The step of heating the mixture to cause the particle binder to melt and flow, thus adhering the binder to the grain and fixing the grain in an agglomerated form is referred to as firing, calcining or sintering. Any method known in the art for agglomerating mixtures of particles may be used to prepare the abrasive agglomerate grains.

In a first embodiment of the process used herein to make agglomerate grains, the initial mixture of particles and particle binder is agglomerated before firing the mixture so as to create a relatively weak mechanical structure referred to as a "green agglomerate" or "pre-fired agglomerate."

To carry out a first embodiment, the abrasive particles and an inorganic particle binder are agglomerated in the green state by any one of a number of different techniques, e.g., in a pan pelletizer, and then fed into a rotary calcination apparatus for sintering. The green agglomerates can also be placed onto a tray or rack and oven fired, without tumbling, in a continuous or batch process.

In an another process the abrasive particles are conveyed into a fluidized bed, then wetted with a liquid containing the particle binder to adhere the binder to the surface of the particles, screened for agglomerate size, and then fired in an oven or calcination apparatus.

Pan pelletizing is often carried out by adding particles to a mixer bowl, and metering a liquid component (e.g., water, or organic binder and water) containing the particle binder onto the grain, with mixing, to agglomerate them together. Alternatively a liquid dispersion of the particle binder, optionally with an organic binder, is sprayed onto the particles, and then the coated particles are mixed to form agglomerates.

A low-pressure extrusion apparatus may be used to extrude a paste of particles and particle binder into sizes and shapes which are dried to form agglomerate grains. A paste may be made of the particle binder and the particles optionally with an organic temporary binder and extruded into elongated particles with the apparatus and method disclosed in U.S. Pat. No. 4,393,021.

In a dry granulation process, a sheet or block made of abrasive particles imbedded in dispersion or paste of the particle binder is dried and then broken up using a roll compactor to form precursors of the agglomerate grains.

In another method of making green or precursor agglomerate grains, the mixture of the particle binder and the particles are added to a molding device and the mixture molded to form precise shapes and sizes, for example, in the manner disclosed in U.S. Pat. No. 6,217,413.

In another embodiment of the process useful herein for making agglomerate grains, a mixture of the abrasive particles, particle binder and a temporary organic binder system is fed into an oven, without pre-agglomeration and heated. The mixture is heated to a temperature high enough to cause the particle binder to melt, flow and adhere to the particles, after which the mixture is cooled to make a composite. The composite is crushed and screened to make the sintered agglomerate grains.

It is further possible to sinter the agglomerates while the particles and the binder are contained in a shaped cavity such that the agglomerates as produced have a specific shape such as a square-based pyramid. The shapes need not be exact and indeed because the amount of particle binder is relatively small, the sides of the shapes will often be relatively rough.

However such agglomerated grains can be extremely useful in producing coated abrasives with the ability to produce a very uniform surface in a very aggressive abrading operation.

Preferred Manufacture of Abrasive Agglomerates

In a preferred process for making agglomerates, a simple mixture of the particles and an inorganic particle binder (optionally with an organic temporary binder) is fed into a rotary calcination apparatus of the type shown in FIG. 1. The mixture is tumbled at a predetermined rpm, along a predetermined incline with the application of heat. Agglomerate grains are formed as the particle binder heats, melts, flows and adheres to the particles. The firing and agglomeration steps are carried out simultaneously at controlled rates and volumes of feeding and heat application. The feed rate generally is set to yield a flow occupying roughly 8–12%, by volume, of the tube of the rotary calcination apparatus. The maximum temperature exposure within the apparatus is selected to keep the viscosity of the particle binder materials in a liquid state at a viscosity of at least about 1,000 poise. This avoids excessive flow of the particle binder onto the surface of the tube and a resulting loss from the surface of the abrasive particles.

A rotary calcination apparatus of the type illustrated in FIG. 1 may be used to carry out the agglomeration process for agglomerating and firing the agglomerates in a single process step. As shown in FIG. 1, a feed hopper (10) containing the feedstock (11) mixture of particle binder and abrasive particles is fed into a means (12) for metering the mixture into a hollow heating tube (13). The tube (13) is positioned at an incline angle (14) of approximately 0.5–5.0 degrees such that the feedstock (1) can be gravity fed through the hollow tube (13). Simultaneously, the hollow tube (13) is rotated in the direction of the arrow (a) at a controlled rate to tumble the feedstock (11) and the heated mix (18) as they pass along the length of the hollow tube.

A portion of the hollow tube (13) is heated. In one embodiment, the heating portion may comprise three heating zones (15, 16, 17) having a length dimension (d1) of 60 inches (152 mm) along the length (d2) of 120 inches (305 mm) of the hollow tube (13). The heating zones permit the operator to control the processing temperature and to vary it as needed to sinter the agglomerate grains. In other models of the apparatus, the hollow tube may only comprise one or two heating zones, or it may comprise more than three heating zones. Although not illustrated in FIG. 1, the apparatus is equipped with a heating device and mechanical, electronic and temperature control and sensing devices operative for carrying out the thermal process. As can be seen in the cross-sectional view of the hollow tube (13), the feedstock (11) is transformed to a heated mix (18) within the tube and it exits the tube and is collected as agglomerate granules (19). The wall of the hollow tube has an inner diameter dimension (d3) which may range from 5.5 to 30 inches (14–76 mm) and a diameter (d4) which may range from 6 to 36 inches (15–91 mm), depending upon the model and the type of material used to construct the hollow tube (e.g., refractory metal alloy, stainless steel, refractory brick, silicon carbide, mullite). The material selected for the construction of the tube depends largely on the temperatures reached. Temperatures up to 1000° C. can usually be accommodated by a stainless steel tube but over this temperature a silicon carbide tube is often preferred.

The incline angle of the tube may range from 0.5 to 5.0 degrees and the rotation of the tube may operate at 0.5 to 10 rpm. The feed rate for a small scale rotary calciner may range from about 5 to 10 kg/hour, and an industrial production scale feed rate may range from about 227 to 910 kg/hour. The rotary calciner may be heated to a sintering temperature of 800 to 1400° C., and the feed material may be heated at a rate of up to 200° C./minute as the feedstock enters the heated zone. Cooling occurs in the last portion of the tube as the feedstock moves from a heated zone to an unheated zone. The product is cooled, e.g., with a water cooling system, to room temperature and collected.

Suitable rotary calcination machines may be obtained from Harper International, Buffalo, N.Y., or from Alstom Power, Inc., Applied Test Systems, Inc., and other equipment manufacturers. The apparatus optionally may be fitted with electronic, in-process control and detection devices, a cooling system, various designs of feed apparatus and other optional devices.

Manufacture of Coated Abrasives

The coated abrasive according to the invention can have the form of an abrasive belt, sheet, individual abrasive disc or a composite abrasive in any structure or format. Thus the substrate to which the abrasive agglomerate grains are adhered can be a film, paper, textile, fiber (both in the non-woven web form or as a lofty fibrous structure) or even a foam material. The term "coated abrasive" as used herein therefore embraces both conventional abrasive products such as belts and discs using a planar substrate made of conventional materials and in addition products in which the abrasive agglomerates of the invention are adhered to a lofty fibrous structure of the type often called "composite abrasives" and those in which they are dispersed in and adhered within the surface layers of an open-celled foam structure.

The coated abrasive of the invention can be formed in any of the conventional techniques know in the prior art. These include application over a make coat deposited on a substrate followed by deposition of a size coat, as well the deposition of the abrasive agglomerate grains dispersed within a suitable curable binder on a substrate. The curable binder can be cured as applied or the surface can be treated by known techniques to impose a surface structure thereon.

Likewise coated abrasives in which the abrasive agglomerate grains are deposited on lofty fibrous structures or in at least the surface layers of a polymer foam can be obtained using processes know in the art.

A coated abrasive can be formed by deposition of the abrasive agglomerate grains on to a substrate that has been coated with a maker coat in the conventional way. In this event the deposition can be by gravity feed or by a UP process. When a vitreous particle binder is used to form the agglomerates, it becomes possible to use the UP deposition technique which is generally preferred for coated abrasives. This technique is less well adapted for depositing agglomerates made using an organic resin as the particle binder since such grains do not project well under the influence of an electrostatic field.

The abrasive agglomerate grain can be deposited alone or in admixture with other conventional abrasive grains. The level of application can provide for a closed coat, (100% coverage of the surface area of the substrate to which the grains are applied), or a more open coat wherein the grains are separated to some degree depending on the degree of "openness". In some case it is desirable to apply the abrasive agglomerate grains over a previously deposited layer of another abrasive, perhaps one of lesser quality, to provide better support for the abrasive agglomerate grains.

Where the coated abrasive is formed in the conventional way using make and size coats to anchor the agglomerate grains, it is often preferred that the application of the size coat does not have the effect of significantly reducing the porosity of the abrasive agglomerate grains. The size coat is typically a relatively fluid curable resin formulation and if this is applied under some pressure, for example by a roll application technique, the curable formulation can be forced into the pores of the grain thereby reducing an important property of the abrasive agglomerate grains. It is therefore preferred that the size coat be applied using a non-contact technique such as spray application. In addition or alternatively, it is often desirable to modify the size coat resin properties to increase the viscosity, perhaps by the addition of fillers such as silica, to minimize the tendency of the resin to penetrate the grain structure. Preferably the viscosity in adjusted to a value of at least 1000 centipoise and more preferably to at least 1500 centipoise or higher. Where the binder is used as a matrix to hold the agglomerate grain and simultaneously attach it to the backing a similar viscosity adjustment is preferred.

In the manufacture of a coated abrasive using a maker coat, the grains do not become immersed in the maker coat which is in any case usually partially cured and therefore not very fluid when it receives the abrasive agglomerates. However the size coat is usually applied over the agglomerate grain and therefore has significantly greater opportunities for penetration of the structure of the agglomerate. While an a excessive loss of the openness of an agglomerate structure comprising many particles may be undesirable, a limited amount of penetration of the structure of the agglomerate need not necessarily be a bad thing since the effect is to increase the surface area of the grain in contact with the size coat and thereby strengthen the grip on the grain exerted by the size coat.

The coated abrasive can also be formed by application of a slurry comprising the abrasive agglomerate grains, dispersed in a curable binder formulation, to a suitable backing material. In this case also the binder can be treated to reduce penetration of the structure of the abrasive agglomerate grains by the binder resin. Application of the slurry can be accomplished in two or more operations, optionally using different formulations in the successive depositions. This allows a certain flexibility to vary the nature of the abrasive action as the coated abrasive wears.

Coated abrasive belts according to the invention may need to be flexed before use as is usual with belts made using a binder resin that sets to an inflexible layer. In addition it is often desirable to dress the grinding surface before use to ensure uniform high cut rates from the start.

Lofty fibrous structures according to the invention can be made for example by treating a lofty mat of fibers with a binder material, frequently using a spray technique, and then depositing the abrasive agglomerate grains thereon before curing the binder resin. The products according to the invention in this form have particular utility for polishing and finishing of metal surfaces.

EXAMPLES

The Invention is now illustrated using the following Examples which are intended to show the surprisingly advantageous properties of the products according to the invention.

Manufacture of Vitreous Bonded Abrasive Agglomerate Grains

The agglomerate grains evaluated in the following Examples were made by a process corresponding to the "Preferred Manufacture of Abrasive Agglomerates" described above and using the equipment illustrated in FIG. 1.

The first six Examples illustrate the production of the abrasive agglomerates used in the invention. The agglomerate grains made in this fashion were incorporated into coated abrasives to evaluate their performance by comparison with conventional high quality commercial abrasive grains. The results are documented in the Examples 7–9 which are provided by way of illustration of the invention, and not by way of limitation.

Example 1

A series of agglomerated abrasive grain samples were prepared in a rotary calcination apparatus (electric fired model # HOU-5D34-RT-28, 1,200° C. maximum temperature, 30 KW input, equipped with a 72" (183 cm) long, 5.5" (14 cm) inner diameter refractory metal tube, manufactured by Harper International, Buffalo, N.Y.). The refractory metal tube was replaced with a silicon carbide tube of the same dimensions, and the apparatus was modified to operate at a maximum temperature of 1,550° C. The process of agglomeration was carried out under atmospheric conditions, at a hot zone temperature control set point of 1,180° C., with an apparatus tube rotation rate of 9 rpm, a tube incline angle of 2.5 to 3 degrees, and a material feed rate of 6–10 kg/hour. The apparatus used was substantially identical to the apparatus illustrated in FIG. 1. The yield of usable free-flowing granules (defined as −12 mesh to pan) was 60 to 90 % of the total weight of the feedstock before calcination.

The agglomerate samples were made from a simple mixture of abrasive particles and water mixtures described in Table 1-1. The vitrified bond particle binder used to prepare the samples are listed in Table 2. Samples were prepared from three types of abrasive particles: alumina 38A, fused alumina 32A and sintered sol gel alpha-alumina Norton SG grain, obtained from Saint-Gobain Ceramics & Plastics, Inc., Worcester, Mass., USA, in the grit sizes listed in Table 1.

After agglomeration in the rotary calcination apparatus, the agglomerated abrasive grain samples were screened and tested for loose packing density (LPD), size distribution and agglomerate strength. These results are shown in Table 1.

TABLE 1-1

Agglomerated Grain Characteristics

| Sample No grain liquid particle binder | Weight lbs (Kg) of mix | Binding material Weight % (on grain basis) | Volume % of binding material | LPD g/cc −12/ pan | Average size distribution microns | Average size distrib mesh size | Average % relative density | pressure at 50% crushed fraction MPa |
|---|---|---|---|---|---|---|---|---|
| 1 60 grit 38A water A binder | 30.00 (13.6) 0.60 (0.3) 0.64 (0.3) | 2.0 | 3.18 | 1.46 | 334 | −40/+50 | 41.0 | 0.6 ± 0.1 |

TABLE 1-1-continued

Agglomerated Grain Characteristics

| Sample No grain liquid particle binder | Weight lbs (Kg) of mix | Binding material Weight % (on grain basis) | Volume % of binding material | LPD g/cc −12/pan | Average size distribution microns | Average size distrib mesh size | Average % relative density | pressure at 50% crushed fraction MPa |
|---|---|---|---|---|---|---|---|---|
| 2<br>90 grit 38A<br>water<br>E binder | 30.00 (13.6)<br>0.90 (0.4)<br>1.99 (0.9) | 6.0 | 8.94 | 1.21 | 318 | −45/+50 | 37.0 | 0.5 ± 0.1 |
| 3<br>120 grit 38A<br>water<br>C binder | 30.00 (13.6)<br>1.20 (0.5)<br>3.41 (1.5) | 10.0 | 13.92 | 0.83 | 782 | −20/+25 | 22.3 | 2.6 ± 0.2 |
| 4<br>120 grit 32A<br>water<br>A binder | 30.00 (13.6)<br>0.90 (0.4)<br>1.91 (0.9) | 6.0 | 8.94 | 1.13 | 259 | −50/+60 | 31.3 | 0.3 ± 0.1 |
| 5<br>60 grit 32A<br>water<br>E binder | 30.00 (13.6)<br>1.20 (0.5)<br>3.31 (1.5) | 10.0 | 14.04 | 1.33 | 603 | −25/+30 | 37.0 | 3.7 ± 0.2 |
| 6<br>90 grit 32A<br>water<br>C binder | 30.00 (13.6)<br>0.60 (0.3)<br>0.68 (0.3) | 2.0 | 3.13 | 1.03 | 423 | −40/+45 | 28.4 | 0.7 ± 0.1 |
| 7<br>90 grit SG<br>water<br>A binder | 30.00 (13.6)<br>1.20 (0.5)<br>3.18 (1.4) | 10.0 | 14.05 | 1.20 | 355 | −45/+50 | 36.7 | 0.5 ± 0.1 |
| 8<br>120 grit SG<br>water<br>E binder | 30.00 (13.6)<br>0.60 (0.3)<br>0.66 (0.3) | 2.0 | 3.15 | 1.38 | 120 | −120/+140 | 39.1 | — |
| 9<br>60 grit SG<br>water<br>C binder | 30.00 (13.6)<br>0.90 (0.4)<br>2.05 (0.9) | 6.0 | 8.87 | 1.03 | 973 | −18/+20 | 27.6 | — |

[a] The volume % binder is a percentage of the solid material within the grain (i.e., binding material and particles) after firing, and does not include the volume % porosity.

The volume % binder of the fired agglomerate grains was calculated using the average LOI (loss on ignition) of the binder raw materials.

The sintered agglomerate grains were sized with U.S. standard testing sieves mounted on a vibrating screening apparatus (Ro-Tap; Model RX-29; W. S. Tyler Inc. Mentor, Ohio). Screen mesh sizes ranged from 18 to 140, as appropriate for different samples. The loose packed density of the sintered agglomerate grains (LPD) was measured by the American National Standard procedure for Bulk Density of Abrasive Grains.

The initial average relative density, expressed as a percentage, was calculated by dividing the LPD ($\rho$) by a theoretical density of the agglomerate grains ($\rho_0$), assuming zero porosity. The theoretical density was calculated according to the volumetric rule of mixtures method from the weight percentage and specific gravity of the particle binder and of the abrasive particles contained in the agglomerates.

The strength of the agglomerate grains was measured by a compaction test. The compaction tests were performed using one inch (2.54 cm) in diameter lubricated steel die on an Instron® universal testing machine (model MTS 1125, 20,000 lbs (9072 Kg)) with a 5 gram sample of agglomerate grain. The agglomerate grain sample was poured into the die and slightly leveled by tapping the outside of the die. A top punch was inserted and a crosshead lowered until a force ("initial position") was observed on the recorder. Pressure at a constant rate of increase (2 mm/min) was applied to the sample up to a maximum of 180 MPa of pressure. The volume of the agglomerate grain sample (the compacted LPD of the sample), observed as a displacement of the crosshead (the strain), was recorded as the relative density as a function of the log of the applied pressure. The residual material was then screened to determine the percent crush fraction. Different pressures were measured to establish a graph of the relationship between the log of the applied pressure and the percent crush fraction. Results are reported in Table 1 as the log of the pressure at the point where the crush fraction equates to 50 weight percent of the agglomerate grain sample. The crush fraction is the ratio of the weight of crushed particles passing through the smaller screen to the weight of the initial weight of the sample.

The finished, sintered agglomerates had three-dimensional shapes varying among triangular, spherical, cubic, rectangular and other geometric shapes. Agglomerates consisted of a plurality of individual abrasive grits (e.g., 2 to 20 grits) bonded together by glass binding material at grit to grit contact points.

Agglomerate grain size increased with an increase in amount of binding material in the agglomerate grain over the range from 3 to 20 weight % of the particle binder.

Adequate compaction strength was observed for all samples 1–9, indicating that the glass particle binder had matured and flowed to create an effective bond among the abrasive particles within the agglomerate grain. Agglomerate grains made with 10 weight % particle binder had significantly higher compaction strength than those made with 2 or 6 weight % of particle binder.

Lower LPD values were an indicator of a higher degree of agglomeration. The LPD of the agglomerate grains decreased with increasing weight % particle binder and with decreasing abrasive particle size. Relatively large differences between 2 and 6 weight % particle binder, compared with relatively small differences between 6 and 10 weight % particle binder indicate a weight % particle binder of less than 2 weight % may be inadequate for formation of agglomerate grains. At the higher weight percentages, above about 6 weight %, the addition of more particle binder may not be beneficial in making significantly larger or stronger agglomerate grains.

As suggested by agglomerate grain size results, particle binder C samples, having the lowest molten glass viscosity at the agglomerating temperature, had the lowest LPD of the three particle binder. The abrasive type did not have a significant effect upon the LPD.

Example 2

Additional samples of agglomerate grains were made utilizing various other processing embodiments and feedstock materials.

A series of agglomerate grains (sample nos. 10–13) were formed at different sintering temperatures, ranging from 1100 to 1250° C., utilizing a rotary calcination apparatus (model #HOU-6D60-RTA-28, equipped with a 120 inch (305 cm) long, 5.75 inch (15.6 cm) inner diameter, ⅜ inch (0.95 cm) thick, mullite tube, having a 60 inch (152 cm) heated length with three temperature control zones. The apparatus was manufactured by Harper International, Buffalo, N.Y.). A Brabender feeder unit with adjustable control volumetric feed-rate was used to meter the abrasive particles and particle binder mixture into the heating tube of the rotary calcination apparatus. The process of agglomeration was carried under atmospheric conditions, with an apparatus tube rotation rate of 4 rpm, a tube incline angle of 2.5 degrees, and a feed rate of 8 kg/hour. The apparatus used was substantially identical to the apparatus illustrated in FIG. 1. Temperature selections and other variables utilized to make these agglomerates are set forth in Table 2-1.

All samples contained a mixture, on a weight % basis, of 89.86 % abrasive particles (60 grit 38A alumina obtained from Saint-Gobain Ceramics & Plastics, Inc.), 10.16% temporarye binder mixture (6.3 wt % AR30 liquid protein binder, 1.0 % Carbowax® 3350 PEG and 2.86% of particle binder A). This mixture yielded 4.77 volume % particle binder and 95.23 volume % abrasive particles in the sintered agglomerate grain. The calculated theoretical density of the agglomerate grains (assuming no porosity) was 3.852 g/cc.

Prior to placing the mixture into the feeder unit, green stage agglomerate grains were formed by simulated extrusion. To prepare extruded agglomerate grains, the liquid protein temporary binder was heated to dissolve the Carbowax® 3350 PEG. Then the particle binder was added slowly while stirring the mixture. Abrasive particles were added to a high shear mixer (44 inch (112 cm) diameter) and the prepared particle binder mixture was slowly added to the particles in the mixer. The combination was mixed for 3 minutes. The mixed combination was wet-screened through a 12 mesh box screen (US standard sieve size) onto trays in a layer at a maximum depth of one inch (2.5 cm) to form wet, green (unfired), extruded agglomerate grains. The layer

TABLE 2

Particle Binder used in the Agglomerates

| Fired Composition Components[b] | A Particle Binder Wt % (A-1 particle binder)[a] | B Particle Binder wt % | C Particle Binder wt % | D Particle Binder wt % | E Particle Binder wt % | F Particle Binder wt % |
|---|---|---|---|---|---|---|
| Alumina | 15 (11) | 10 | 14 | 10 | 18 | 16 |
| Glass Formers ($SiO_2$, $B_2O_3$) | 69 (72) | 69 | 71 | 73 | 64 | 68 |
| alkaline earth (CaO, MgO) | 5–6 (7–8) | <0.5 | <0.5 | 1–2 | 6–7 | 5–6 |
| Alkali ($Na_2O$, $K_2O$, $Li_2O$) | 9–10 (10) | 20 | 13 | 15 | 11 | 10 |
| Spec. Gravity g/cc | 2.40 | 2.38 | 2.42 | 2.45 | 2.40 | 2.40 |
| Estimated Viscosity (Poise) at 1180° C. | 25,590 | 30 | 345 | 850 | 55,300 | 7,800 |

[a]The A-1 particle binder variation set forth in parentheses was used for the samples of Example 2.
[b]Impurities (e.g., $Fe_2O_3$ and $TiO_2$) are present at about 0.1–2%.

of extruded agglomerate grains was oven dried at 90° C. for 24 hours. After drying, the agglomerate grains were screened again using a 12 to 16 mesh (U.S. standard sieve size) box screen.

It was observed during rotary calcination that the agglomerate grains made in the green state appeared to break apart when heated, and, then, re-formed as they tumbled out of the exit end of the heated portion of the rotary calciner tube. The larger size of the agglomerated grains made in the green state, relative to that of the agglomerated grains after firing, was readily apparent upon visual inspection of the samples.

After firing, the agglomerated grain sizes were observed to be sufficiently uniform for commercial purposes, with a size distribution over a range of about 500–1200 microns. The size distribution measurements are set forth in Table 2-2, below.

TABLE 2-1

| Sample No. | Sintering Temp.[a] ° C. | % Yield −12 mesh | Ave. size μm | LPD g/cc −12 mesh | pressure at 50% crushed fraction MPa | % yield −16/+35 mesh | Ave. agglom size μm | LPD g/cc −16/+35 mesh |
|---|---|---|---|---|---|---|---|---|
| (10) | 1100 | n/a[b] | n/a | n/a | n/a | n/a | 536 | n/a |
| (11) | 1150 | 97.10 | 650 | 1.20 | 13 ± 1 | 76.20 | 632 | 0.95 |
| (12) | 1200 | 96.20 | 750 | 1.20 | 9 ± 1 | 87.00 | 682 | 1.04 |
| (13) | 1250 | 96.60 | 675 | 1.25 | 8 ± 1 | 85.20 | 641 | 1.04 |

[a]Temperature of rotary calciner controller set point (for all 3 zones).
[b]"n/a" indicates no measurement was made.

TABLE 2-2

Size distribution for fired agglomerate grains

| Sieve # ASTM-E Sample No. | Sieve # ISO 565 μm | Weight % on Screen | | | |
|---|---|---|---|---|---|
| | | 10 | 11 | 12 | 13 |
| −35 | −500 | 41.05 | 17.49 | 11.57 | 14.31 |
| 35 | 500 | 22.69 | 17.86 | 14.56 | 17.69 |
| 30 | 600 | 18.30 | 24.34 | 21.27 | 26.01 |
| 25 | 725 | 12.57 | 21.53 | 24.89 | 23.06 |
| 20 | 850 | 3.43 | 13.25 | 16.17 | 12.43 |
| 18 | 1000 | 1.80 | 4.58 | 10.09 | 5.97 |
| 16 | 1180 | 0.16 | 0.95 | 1.44 | 0.54 |

Example 3

Agglomerate grains (sample nos. 14–23) were prepared as described in Example 2, except the temperature was maintained constant at 1000° C., and a model #KOU-8D48-RIA-20 rotary calciner apparatus, equipped with a 108 inch (274 cm) long, 8 inch (20 cm) inner diameter, fused silica tube, having a 48 inch (122 cm) heated length with three temperature control zones, was used. The apparatus was manufactured by Harper International, Buffalo, N.Y. Various methods were examined for preparation of the pre-fired mixture of abrasive particles and particle binder material. The process of agglomeration was carried under atmospheric conditions, with an apparatus tube rotation rate of 3 to 4 rpm, a tube incline angle of 2.5 degrees, and a feed rate of 8 to 10 kg/hour. The apparatus used was substantially identical to the apparatus illustrated in FIG. 1.

All samples contained 30 lbs (13.6 Kg) abrasive particles (the same as were used in Example 2, except that sample 16 contained 25 lbs (11.3 Kg) of 70 grit Norton SG® sol gel alumina, obtained from Saint-Gobain Ceramics and Plastics, Inc.) and 0.9 lbs (0.41 Kg) particle binder A (yielding 4.89 volume % particle binder material in the sintered agglomerate grain). The particle binder material was dispersed in different temporary binder systems prior to addition to the abrasive particles. The temporary binder system of Example 2 ("Binder 2") was used for some samples and other samples were made using AR30 liquid temporary binder ("Binder 3") in the weight percentages listed below in Table 3. Sample 20 was used to prepare agglomerate grains in the green, unfired state by the simulated extrusion method of Example 2.

The variables tested and the test results of the tests are summarized in Table 3.

TABLE 3

Green stage binder treatments

| Sample No. | Mix Treatment | wt % binder (as % of grain wt) | % Yield −12 mesh screen | LPD g/cc |
|---|---|---|---|---|
| 14 | Binder 3 | 2.0 | 100 | 1.45 |
| 15 | Binder 3 | 1.0 | 100 | 1.48 |
| 16 | Binder 3; SG grain | 4.0 | 92 | 1.38 |
| 17 | Binder 3 | 4.0 | 98 | 1.44 |
| 18 | Binder 2 | 6.3 | 90 | 1.35 |
| 19 | Binder 3 | 8.0 | 93 | 1.30 |
| 20 | Binder 2; simulated extrusion | 6.3 | 100 | 1.37 |
| 21 | Binder 3 | 3.0 | 100 | 1.40 |
| 22 | Binder 3 | 6.0 | 94 | 1.44 |
| 23 | Binder 2 | 4.0 | 97 | 1.54 |

These results confirm that green stage agglomeration is not needed to form an acceptable quality and yield of sintered agglomerated grains (compare samples 18 and 20). As the wt % of Binder 3 used in the initial mix increased from 1 to 8 %, the LPD showed a trend towards a moderate decrease, indicating that the use of a binder has a beneficial, but not essential, effect upon the agglomeration process. Thus, rather unexpectedly, it did not appear necessary to pre-form a desired agglomerate grain shape or size prior to sintering it in a rotary calciner. The same LPD was achieved merely by feeding a wet mixture of the agglomerate components into the rotary calciner and tumbling the mixture as it passes through the heated portion of the apparatus.

Example 4

Agglomerate grains (sample nos. 24–29) were prepared as described in Example 2, except the temperature was maintained constant at 1200° C. and various methods were examined for preparation of the pre-fired mixture of abrasive particles and particle binder. All samples (except samples 28–29) contained a mixture of 300 lbs (136.4 Kg) abrasive particles (same as in Example 2: 60 grit 38A alumina) and 9.0 lbs (4.1 Kg) of particle binder A (yielding 4.89 volume % particle binder in the sintered agglomerate grain).

Sample 28 (same composition as Example 2) contained 44.9 lbs (20.4 Kg) of abrasive particles and 1.43 lbs (0.6 Kg) of temporary binder A. The binder was combined with the liquid binder mixture (37.8 wt % (3.1 lbs) of AR30 binder in water) and 4.98 lbs of this combination was added to the abrasive particles. The viscosity of the liquid combination was 784 CP at 22° C. (Brookfield LVF Viscometer).

Sample 29 (same composition as Example 2) contained 28.6 lbs (13 Kg) of abrasive particles and 0.92 lbs (0.4 Kg) of particle binder A (yielding 4.89 volume % particle binder in the sintered agglomerate grain). The particle binder was combined with the liquid temporary binder mixture (54.7 wt % (0.48 lbs) Duramax® resin B1052 and 30.1 wt % (1.456 lbs) Duramax resin B1051 resin in water) and this combination was added to the abrasive particles. The Duramax resins were obtained from Rohm and Haas, Philadelphia, Pa.

The process of agglomeration was carried under atmospheric conditions, with an apparatus tube rotation rate of 4 rpm, a tube incline angle of 2.5 degrees, and a feed rate of 8 to 12 kg/hour. The apparatus used was substantially identical to the apparatus illustrated in FIG. 1.

Sample 28 was pre-agglomerated, before calcination, in a fluidized bed apparatus made by Niro, Inc., Columbia, Md. (model MP-2/3 Multi-Processor™, equipped with a MP-1 size cone (3 feet (0.9 meter) in diameter at its widest width). The following process variables were selected for the fluidized bed process sample runs:

inlet air temperature 64–70° C.

inlet air flow 100–300 cubic meters/hour granulation liquid flow rate 440 g/min bed depth (initial charge 3–4 kg) about 10 cm air pressure 1 bar two fluid external mix nozzle 800 micron orifice The abrasive particles were loaded into the bottom apparatus and air was directed through the fluidized bed plate diffuser up and into the particles. At the same time, the liquid mixture of particle binder and temporary binder was pumped to the external mix nozzle and then sprayed from the nozzles through the plate diffuser and into the particles, thereby coating individual particles. Green stage agglomerate grains were formed during the drying of the particle binder and binder mixture.

Sample 29 was pre-agglomerated, before calcination, in a low pressure extrusion process using a Benchtop Granulator® made by LCI Corporation, Charlotte, N.C. (equipped with a perforated basket having 0.5 mm diameter holes). The mixture of abrasive particles, particle binder and temporary binder was manually fed into the perforated basket (the extruder screen), forced through the screen by rotating blades and collected in a receiving pan. The extruded pre-agglomerate grains were oven-dried at 90° C. for 24 hours and used as feed stock for the rotary calcination process.

The variables tested and the results of the tests are summarized below and in Tables 4-1 and 4-2. These tests confirm the results set forth in Example 3 are also observed at a higher firing temperature (1200 versus 1000° C.). These tests also illustrate that low-pressure extrusion and fluid bed pre-agglomeration may be used to make agglomerated granules, but an agglomeration step before rotary calcination is not necessary to make the agglomerates of the invention.

TABLE 4-1

Agglomerate characteristics

| Sample No. | Mix Treatment | wt % binder on particles wt % basis | % Yield −12 mesh screen | Average size μm | LPD g/cc |
|---|---|---|---|---|---|
| 24 | Binder 3 | 1.0 | 71.25 | 576 | 1.30 |
| 25 | Binder 3 | 4.0 | 95.01 | 575 | 1.30 |
| 26 | Binder 3 | 8.0 | 82.63 | 568 | 1.32 |
| 27 | Binder 2 | 7.2 | 95.51 | 595 | 1.35 |
| 28 | Binder 3 | 7.2 | 90.39 | n/a | n/a |
| 29 | Duramax resin | 7.2 | 76.17 | 600 | 1.27 |

TABLE 4-2

Grit size distribution for agglomerate grains

| Sieve # ASTM-E Sample No. | Sieve # ISO 565 μm | Weight % on Screen | | | | | |
|---|---|---|---|---|---|---|---|
| | | 24 | 25 | 26 | 27 | 28 | 29 |
| −40 | −425 | 17.16 | 11.80 | 11.50 | 11.50 | n/a | 11.10 |
| 40 | 425 | 11.90 | 13.50 | 14.00 | 12.50 | n/a | 12.20 |
| 35 | 500 | 17.30 | 20.70 | 22.70 | 19.60 | n/a | 18.90 |
| 30 | 600 | 20.10 | 25.20 | 26.30 | 23.80 | n/a | 23.70 |
| 25 | 725 | 17.60 | 19.00 | 17.20 | 18.40 | n/a | 19.20 |
| 20 | 850 | 10.80 | 8.10 | 6.40 | 9.30 | n/a | 10.30 |
| 18 | 1000 | 3.90 | 1.70 | 1.60 | 3.20 | n/a | 3.60 |
| 16 | 1180 | 0.80 | 0.10 | 0.30 | 1.60 | n/a | 1.10 |

Example 5

Additional agglomerate grains (sample nos. 30–37) were prepared as described in Example 3, except sintering was done at 1180° C., different types of abrasive particles were tested, and 30 lbs (13.6 Kg) of abrasive particles were mixed with 1.91 lbs (0.9 Kg) of particle binder A (to yield 8.94 volume % particle binder in the sintered agglomerate grains). Binder 3 of Example 3 was compared with water as a temporary binder for green stage agglomeration. Samples 30–34 used 0.9 lbs (0.4 Kg) of water as a temporary binder. Samples 35–37 used 0.72 lbs (0.3 Kg) of Binder 3. The variables tested are summarized below in Table 5.

The process of agglomeration was carried under atmospheric conditions, with an apparatus tube rotation rate of 8.5–9.5 rpm, a tube incline angle of 2.5 degrees, and a feed rate of 5–8 kg/hour. The apparatus used was substantially identical to the apparatus illustrated in FIG. 1.

After agglomeration, the agglomerated abrasive grain samples were screened and tested for loose packing density (LPD), size distribution and agglomerate strength. These results are shown in Table 5.

TABLE 5

| Sample No. | Abrasive particles | Temp. Binder | wt % binder on particles | Average size μm | LPD g/cc | pressure at 50% crushed fraction MPa |
|---|---|---|---|---|---|---|
| 30 | 60 grit 57A alumina | water | 3.0 | 479 | 1.39 | 1.2 ± 0.1 |
| 31 | 60 grit 55A alumina | water | 3.0 | 574 | 1.27 | 2.5 ± 0.1 |
| 32 | 80 grit XG alumina | water | 3.0 | 344 | 1.18 | 0.4 ± 0.1 |
| 33 | 70 grit Targa ® sol gel alumina | water | 3.0 | 852 | 1.54 | 17 ± 1.0 |
| 34 | 70/30 wt % 60 grit 38A/ 60 grit Norton SG alumina | water | 3.0 | 464 | 1.31 | 1.1 ± 0.1 |
| 35 | 60 grit 38A alumina | Binder 3 | 2.4 | n/a | n/a | n/a |
| 36 | 60 grit Norton SG ® alumina | Binder 3 | 2.4 | n/a | n/a | n/a |
| 37 | 60/25/15 wt % 60 grit 38 A/ 120 grit Norton SG/ 320 grit 57A | Binder 3 | 2.4 | n/a | n/a | n/a |

These results again demonstrate the utility of water as a temporary binder for the agglomerate grains in the rotary calcination process. Further, mixtures of grain types, grain sizes, or both, may be agglomerated by the process of the invention and these agglomerates can be coated at a temperature of 1180° C. in the rotary calciner. A significant increase in crush strength was observed when a high aspect ratio (i.e., ≧4:1), elongated abrasive grain was used in making the agglomerate grains (sample 33).

Example 6

Another series of agglomerate grains (sample nos. 38–45) was prepared as described in Example 3, except different sintering temperatures were used, and different types of abrasive particle grit sizes blends and different particle binders were tested. In some of the feedstock mixtures, walnut shell was used as an organic pore inducer filler material (walnut shell was obtained from Composition Materials Co., Inc., Fairfield, Conn., in US Sieve size 40/60). The variables tested are summarized below in Table 6. All samples contained a mixture of 30 lbs (13.6 Kg) abrasive particles and 2.5 wt % Binder 3, on grain weight basis, with various amounts of particle binders as shown in Table 6.

The process of agglomeration was carried under atmospheric conditions, with an apparatus tube rotation rate of 8.5–9.5 rpm, a tube incline angle of 2.5 degrees, and a feed rate of 5–8 kg/hour. The apparatus used was substantially identical to the apparatus illustrated in FIG. 1.

After agglomeration, the agglomerated grain samples were screened and tested for loose packing density (LPD), average size and agglomerate crush strength (see Table 6). The properties of all agglomerate grains were acceptable for use in manufacturing coated abrasives. These data appear to indicate the use of organic pore inducers, i.e., walnut shells, had no significant impact on agglomerate characteristics.

TABLE 6

| Sample No. | Abrasive parts. wt % mixture grit size/type | Binding material | Vol % Fired Particle Binder[a] | Vol % Fired Pore Inducer | LPD g/cc | pressure at 50% crushed fraction MPa |
|---|---|---|---|---|---|---|
| 38 | 90/10 wt % 60 grit 38A/ 70 grit Targa ® sol gel alumina | F | 5.18 | 0 | 1.14 | 11.5 ± 0.5 |
| 39 | 90/10 wt % 60 grit 38A/ 70 grit Targa ® sol gel alumina | C | 7.88 | 2 | 1.00 | 11.5 ± 0.5 |
| 40 | 90/10 wt % 80 grit 38A/ 70 grit Targa ® sol gel alumina | F | 5.18 | 2 | 1.02 | 10.5 ± 0.5 |
| 41 | 90/10 wt % 80 grit 38A/ 70 grit Targa ® sol gel alumina | C | 7.88 | 0 | 0.92 | n/a |
| 42 | 50/50 wt % 60 grit 38A/ 60 grit 32A | F | 5.18 | 2 | 1.16 | 11.5 ± 0.5 |
| 43 | 50/50 wt % 60 grit 38A/ 60 grit 32A | C | 7.88 | 0 | 1.06 | n/a |
| 44 | 50/50 vol % 80 grit 38A/ 60 grit 32A | F | 5.18 | 0 | 1.08 | 8.5 ± 0.5 |
| 45 | 50/50 vol % 80 grit 38A/ 60 grit 32A | C | 7.88 | 2 | 1.07 | 11.5 ± 0.5 |

[a]Volume % is on the basis of total solids (grain, binding material and pore inducer) and does not include the porosity of the agglomerate. 38A and 32A are fused alumina abrasive materials.

Example 7

In this Example the performance of a 17.8 cm (7 inch) disc made using abrasive agglomerates according to the invention was compared with commercial abrasive discs made using conventional materials and abrasive grains.

The abrasive disc according to the invention was made using abrasive agglomerate grains comprising seeded sol-gel alumina abrasive particles with a grit size of 90 obtained from Saint-Gobain Ceramics and Plastics, Inc. These particles were formed into abrasive agglomerate grains as described in connection with the preparation of Sample 7 in Example 1 above. The grains were graded and a −28+40 grade fraction was retained for use.

These abrasive agglomerate grains were used to form a coated abrasive disc by deposition upon a conventional fiber disc substrate using a conventional make coat/size coat technique. The resin used to provide the make and size coats was a conventional phenolic resin. The make coat was applied at a level of 0.12 kg/m$^2$, (8.3 pounds/Ream) and the abrasive agglomerate grains were deposited by a UP technique at a level of 0.28 kg/m$^2$, (19 pounds/Ream). The size coat was applied using a spray technique at a level of 0.49 kg/m$^2$, (33 pounds/Ream), and was a standard phenolic resin with a viscosity of 800 cps modified by the addition of Cab-O-Sil silica from Cabot Corporation to a viscosity of 2000 cps. In each case the "Ream" referred to is a sandpaper-makers ream which corresponds to 330 square feet or 30.7 square meters.

The disc according to the invention was used to abrade a flat bar of 1008 steel. The disc was contacted with the bar for 30 seconds at a contact pressure of 13 lbs/sq.in. and the weight of the bar was measured after each contact to determine the amount of metal removed at each contact. The results were plotted in a graph which is presented as FIG. 2.

Figure 2:
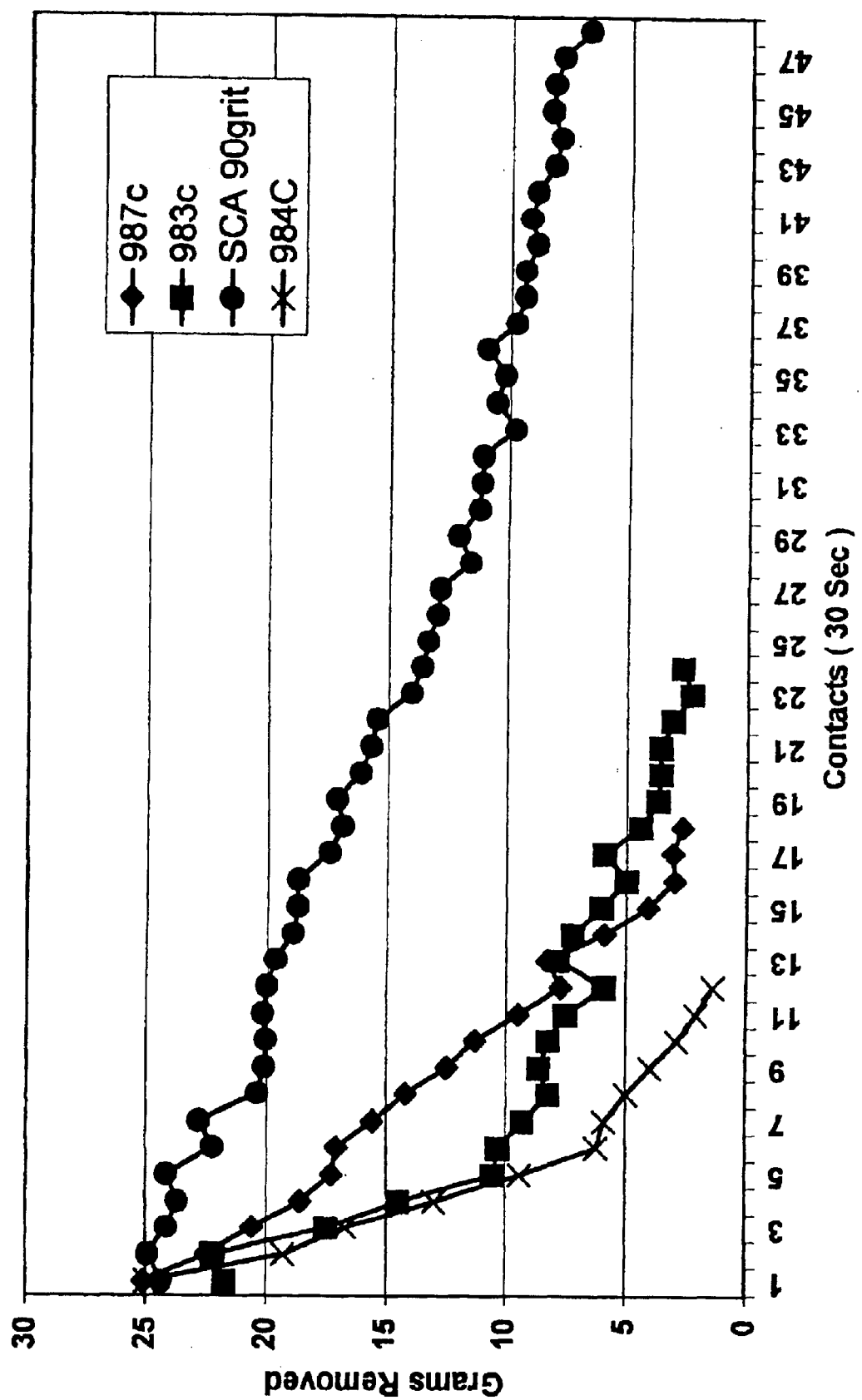
FIG. 2 is a graph showing amount of metal cut in the evaluations of four abrasive discs carried out according to Example 1.

For the sake of comparison three competitive commercial discs of the same size were subjected to the same test and the results are plotted in the same FIG. 2. The discs tested were:

984C which a fiber-backed, 44 coated, seeded sol-gel alumina 80 grit abrasive grain sold by 3M Company;

987C which is similar to 984C except that the abrasive grit is 80 "321 Cubitron®" and the disc had received a supersize treatment. This disc too was sold by 3M Company; and 983C which is the same as 984C except that the grain is an 80 grit MgO-modified sol-gel alumina and the grain is applied by a 100% UP process. This too is available from 3M Company.

As will be apparent from FIG. 2, while all discs started cutting at about the same rate, the disc according to the invention went on cutting far longer and far better than any of the 3M comparative discs.

Example 8

Figure 3:
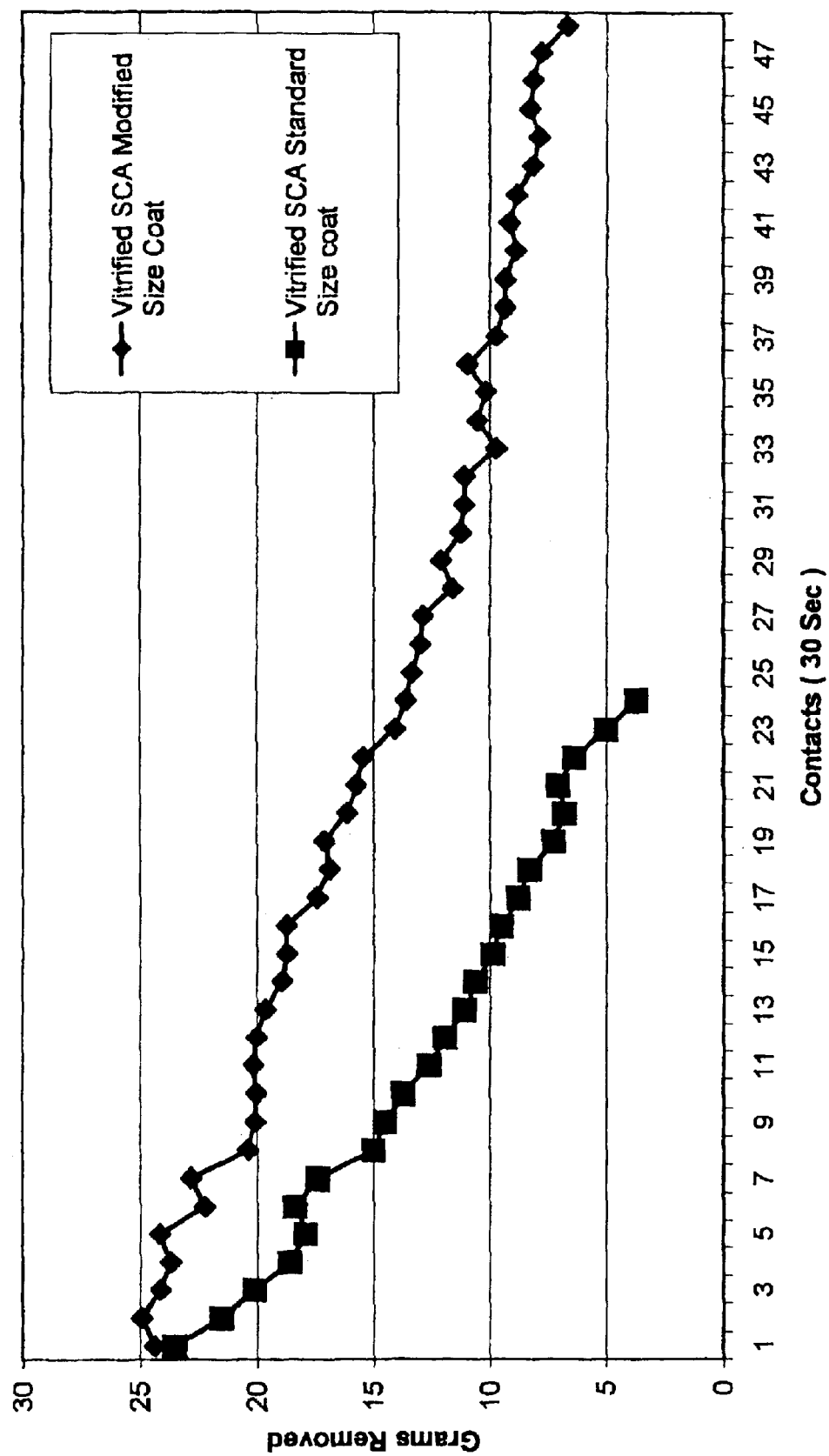
FIG. 3 is a graph showing amount of metal cut in the evaluations of four abrasive discs carried out according to Example 2.

In this Example the effect of using a modified size coat is studied. Two otherwise identical abrasive discs prepared in the same way of the "Invention" disc in Example 1 were made with different size coats. In the first sample the disc was exactly the same as the "Invention" sample from Example 1 and the second was exactly the same except the unmodified size coat was used. The evaluation used the same procedures as are set forth in Example 1 and the results obtained are shown in FIG. 3 of the Drawings.

As will be clearly seen, while the performance is still better than the prior art products, it is not so good as that of the product with the viscosity-modified size coat. This lends credibility to the view that the lower viscosity size to some degree reduces the beneficial effect of porosity in the abrasive agglomerate grains.

Example 9

Figure 4:
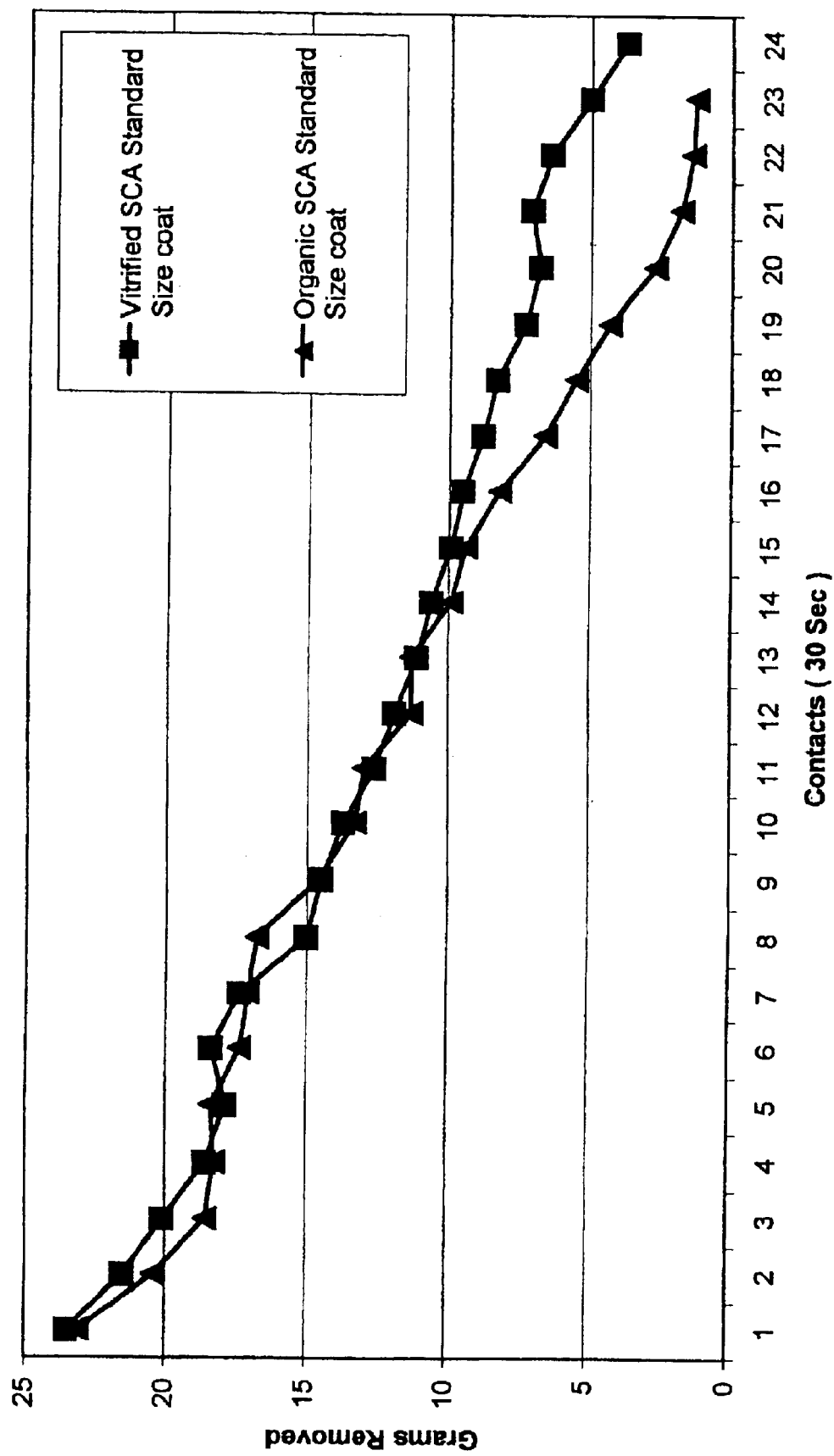
FIG. 4 is a graph showing amount of metal cut in the evaluations of four abrasive discs carried out according to Example 3.
Figure 5:
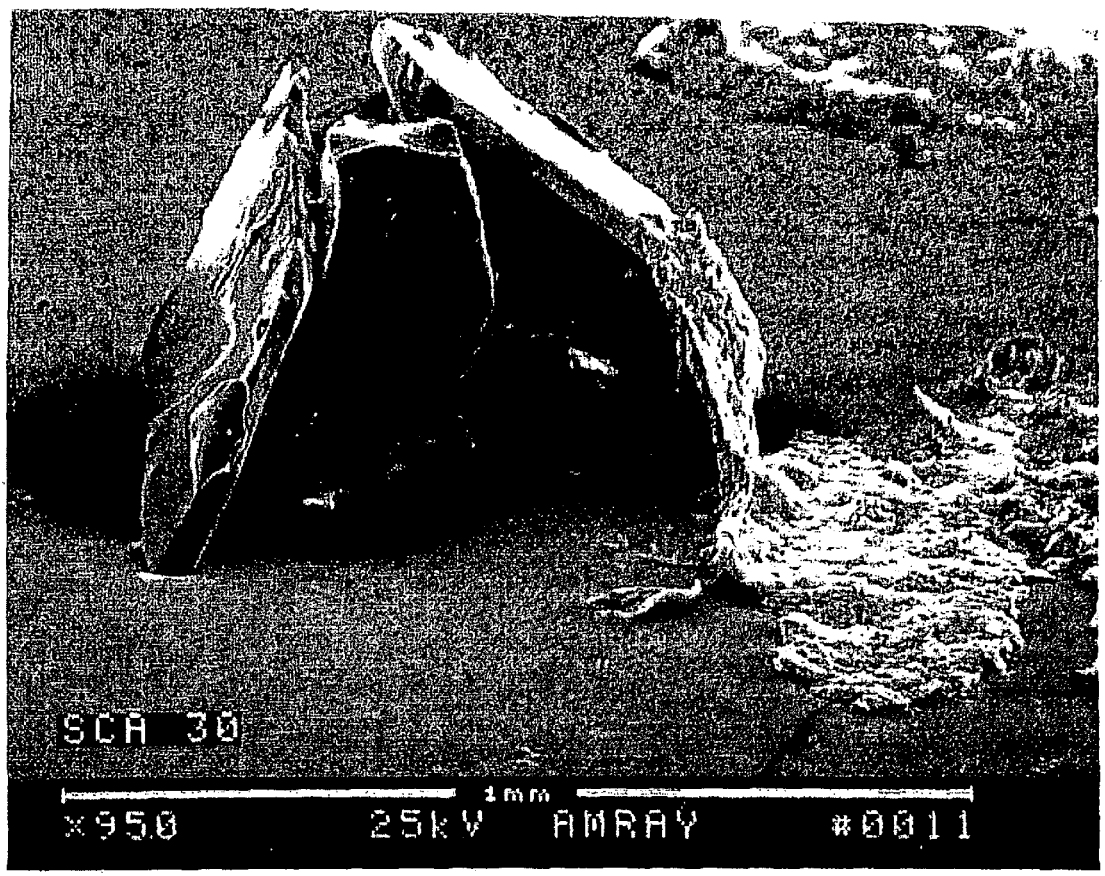
FIGS. 5–7 are enlarged photographs of agglomerates used to produce coated abrasives according to the invention.
Figure 6:
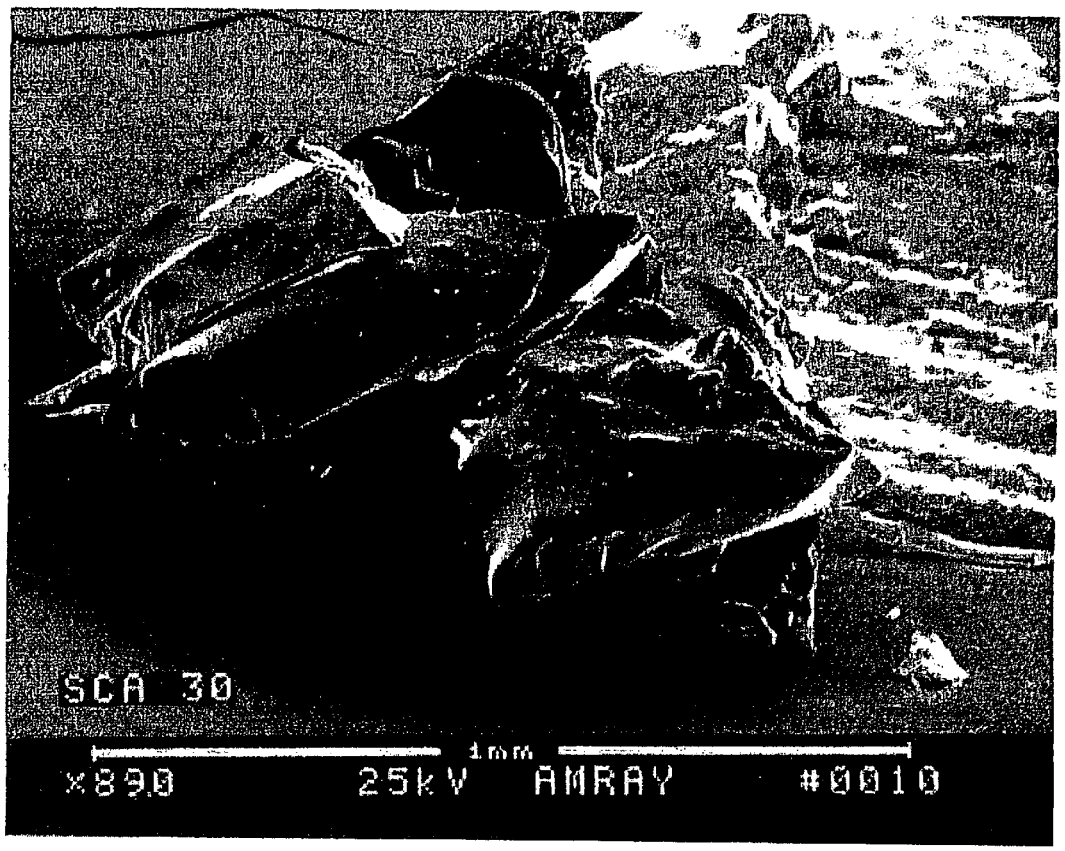
Figure 7:
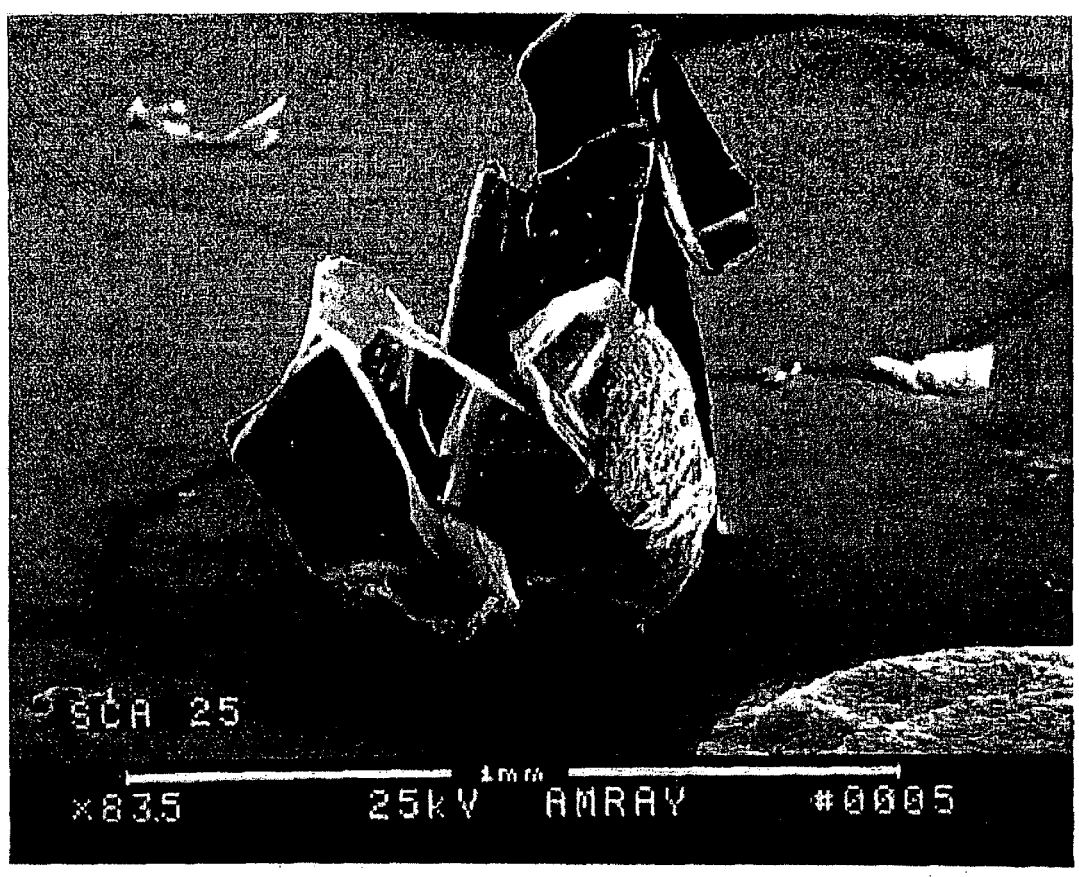

This Example compares the performance of two discs according to the invention, each having a standard (that is unmodified to increase the viscosity as in the disc tested in Example 8) size coat. In this case the only difference between the discs lay in the binder used to bond the abrasive particles together to form the abrasive agglomerate grains. In the sample identified as "Vitrified SCA Standard Size Coat" the bond was vitreous and the sample was that tested in Example 8 as indicated above. In the sample identified as "Organic SCA Standard Size Coat." the bond was an organic bond and the seeded sol-gel alumina abrasive particles in the agglomerates were a little coarser with a grit size of 80. However the porosity was essentially the same. The comparative data, obtained using the same test procedure used in the previous Examples, is plotted on the graph presented as FIG. 4 of the Drawings.

From the graph it will be appreciated that the vitreous bonded agglomerates performed slightly better than the organic-bonded agglomerates, even though the coarser grits in the Organic SCA Standard Size Coat disc would be expected to lead to higher metal removal rates. The difference became more significant in the later stages of the life of the disc.

From the above data it is very clear that the use of abrasive agglomerate grains results in significant improvements over prior art discs especially when the bond holding the agglomerates together is a vitreous bond and the size is given a higher viscosity than would normally be used to inhibit loss of porosity when the agglomerates are used to manufacture a coated abrasive.

We claim:

1. A coated abrasive article comprising a backing material and abrasive agglomerate grains adhered to the backing by a binder material, characterized in that the agglomerate grains used comprise a plurality of abrasive particles adhered together in a three dimensional structure in which each particle is joined to at least one adjacent particle by a particle binder material which is present in the agglomerate as a discontinuous phase located essentially completely in the form of bond posts within the agglomerate grain such that the agglomerate has a loose pack volume that is at least 2% lower than that of the abrasive particles in the individual state.

2. A coated abrasive according to claim 1 in which the abrasive agglomerate grains comprise abrasive particles adhered together by from 5 to 25% by volume, based on the total solids volume of the agglomerate, of a particle binder selected from the group consisting of vitreous, glass-ceramic, organic and metallic particle binder materials.

3. A coated abrasive according to claim 2 in which the particle binder is a vitreous bond material.

4. A coated abrasive according to claim 1 in which the binder adhering the grams to the backing is an organic resin.

5. A coated abrasive according to claim 4 in which the binder is an organic resin having a viscosity to at least 1500 centipoise.

6. A coated abrasive according to claim 5 in which the viscosity of the binder is adjusted using a filler material.

7. A coated abrasive according to claim 1 in which the abrasive particles are used in admixture with a minor proportion of non-abrasive particles selected from the group consisting of grinding aids, fillers and pore-formers in the production of the agglomerate grains.

8. A coated abrasive according to claim 1 in which the abrasive particles are selected from the group consisting of abrasive particles of differing abrasive qualities, abrasive particles of different dimensions, and mixtures thereof.

9. A coated abrasive according to claim 1 in which the agglomerate grains comprise a particle binder selected from vitreous and metallic bond materials and the agglomerate grains are deposited on the backing using a UP process.

10. A coated abrasive according to claim 1 in which the agglomerate grains are dispersed in a matrix of the binder.

11. A coated abrasive according to claim 5 in which the agglomerate grains are dispersed in a matrix of the binder.

12. A coated abrasive according to claim 5 in which the surface of the coated abrasive has an engineered surface comprising a plurality of discrete shapes.

13. A coated abrasive according to claim 1 in which the agglomerate abrasive grains are in the form of shaped structures deposited on the backing in a regular array.

14. A coated abrasive comprising a backing and adhered thereto by a binder, a plurality of abrasive agglomerate grains made by a process comprising the steps:
 a) feeding abrasive particles and a particle binder, selected from the group consisting essentially of vitrified bond materials, vitrified materials, ceramic materials, inorganic binders, organic binders, water solvent and combinations thereof, into a rotary calcinations kiln at a controlled feed rate;
 b) rotating the kiln at a controlled speed;
 c) heating the mixture at a heating rate determined by the feed rate and the speed of the kiln to temperatures from about 145 to 1,300° C.,
 d) tumbling the particles and the particle binder in the kiln until the binder adheres to the particles and a plurality of particles adhere together to create a plurality of sintered agglomerate grains and;
 e) recovering sintered agglomerate grains having an initial three-dimensional shape, a loose packing volume that is at least 2% lower than the corresponding loose pack volume of the constituent particles.

15. A coated abrasive according to claim 14 in which the abrasive agglomerate grains comprise abrasive particles adhered together by from 5 to 25% by volume based on the total solids volume of the agglomerate, of a particle binder selected from the group consisting of vitreous, glass-ceramic, organic and metallic particle binder materials.

16. A coated abrasive material according to claim 15 in which the particle binder is a vitreous bond material.

17. A coated abrasive according to claim 14 in which the binder adhering the grains to the backing is an organic resin.

18. A coated abrasive according to claim 17 in which the binder is an organic resin having a viscosity to at least 1500 centipoise.

19. A coated abrasive according to claim 18 in which the viscosity of the binder is adjusted using a filler material.

20. A coated abrasive according to claim 14 in which the abrasive particles are used in admixture with a minor proportion of non-abrasive particles selected from the group consisting of grinding aids, fillers and pore-formers in the production of the agglomerate grains.

21. A coated abrasive according to claim 14 in which the abrasive particles are selected from the group consisting of abrasive particles of differing abrasive qualities, abrasive particles of different dimensions, and mixtures thereof.

22. A coated abrasive according to claim 14 in which the agglomerate grains comprise a particle binder selected from vitreous and metallic bond materials and the agglomerate grains are deposited on the backing using a UP process.

23. A coated abrasive according to claim 14 in which the agglomerate grains are dispersed in a matrix of the binder.

24. A coated abrasive according to claim 18 in which the agglomerate grains are dispersed in a matrix of the binder.

25. A coated abrasive according to claim 18 in which the surface of the coated abrasive has an engineered surface comprising a plurality of discrete shapes.

26. A coated abrasive according to claim 14 in which the agglomerate abrasive grains are in the form of shaped structures deposited on the backing in a regular array.

27. A coated abrasive comprising a backing and adhered thereto by a binder, a plurality of abrasive agglomerate grains made by a process comprising the steps:
 a) feeding abrasive particles with a particle binder into a rotary calcination kiln at a controlled feed rate;
 b) rotating the kiln at a controlled speed;
 c) heating the mixture at a heating rate determined by the feed rate and the speed of the kiln to temperatures from about 145 to 1,300° C.;
 d) tumbling the particles and the particle binder in the kiln until the binder adheres to the particles and a plurality of particles adhere together to create a plurality of sintered agglomerate grains having a three-dimensional shape and a loose packing volume that is at least 2% lower than the loose packing volume of the constituent particles; and
 e) recovering the sintered agglomerates from the kiln.

28. A coated abrasive according to claim 27 in which the abrasive agglomerate grains comprise abrasive particles adhered together by from 5 to 25% by volume, based on the total solids volume of the agglomerate, of a particle binder selected from the group consisting of vitreous, glass-ceramic, organic and metallic particle binder materials.

29. A coated abrasive according to claim 28 in which the particle binder is a vitreous bond material.

30. A coated abrasive according to claim 27 in which the binder adhering the grains to the backing is an organic resin.

31. A coated abrasive according to claim 30 in which the binder is an organic resin having a viscosity to at least 1500 centipoise.

32. A coated abrasive according to claim 31 in which the viscosity is adjusted using a filler material.

33. A coated abrasive according to claim 26 in which the agglomerate grains are dispersed in a matrix of the binder.

34. A coated abrasive according to claim 31 in which the agglomerate grains are dispersed in a matrix of the binder.

35. A coated abrasive according to claim 27 in which the abrasive particles are used in admixture with a minor proportion of non-abrasive particles selected from the group consisting of grinding aids, fillers and pore-fortuers in the production of the agglomerate grains.

36. A coated abrasive according to claim 27 in which the abrasive particles are selected from the group consisting of abrasive particles of differing abrasive qualities, abrasive particles of different dimensions, and mixtures thereof.

37. A coated abrasive according to claim 27 in which the agglomerate grains comprise a particle binder selected from vitreous and metallic bond materials and the agglomerate grains are deposited on the backing using a UP process.

38. A coated abrasive according to claim 33 in which the surface of the coated abrasive has an engineered surface comprising a plurality of discrete shapes.

39. A coated abrasive according to claim 27 in which the agglomerate abrasive grains are in the form of shaped structures deposited on the backing in a regular array.

* * * * *